United States Patent [19]

Christenson et al.

[11] 4,129,489

[45] Dec. 12, 1978

[54] PREPARATION OF POLYMER BASED POWDER COATINGS BY IONIZING RADIATION

[75] Inventors: Roger M. Christenson; Rostyslaw Dowbenko, both of Gibsonia; Joseph M. Makhlouf, Mars, all of Pa.

[73] Assignee: PPG Industries, Inc., Pittsburgh, Pa.

[21] Appl. No.: 899,426

[22] Filed: Apr. 24, 1978

Related U.S. Application Data

[63] Continuation of Ser. No. 649,118, Feb. 14, 1976, abandoned.

[51] Int. Cl.$^2$ ............................................. C08F 2/54
[52] U.S. Cl. ............................. 204/159.22; 264/140; 264/144; 427/44
[58] Field of Search ................................ 264/140, 144; 204/159.22; 427/44

[56] References Cited

U.S. PATENT DOCUMENTS

| B 417,164 | 3/1976 | Davis et al. | 264/140 |
| 2,701,391 | 2/1955 | Yost et al. | 264/144 |
| 2,921,006 | 1/1960 | Schmitz et al. | 204/159.15 |
| 3,037,963 | 6/1962 | Christenson | 260/72 |
| 3,770,848 | 11/1973 | Labana et al. | 260/836 |
| 3,912,607 | 10/1973 | Communal et al. | 204/159.23 |

OTHER PUBLICATIONS

Smarsh, *Journal of Paint Technology*, vol. 44, No. 565 (Feb. 1972), pp. 30-37.

Chapman et al., *Science and Technology of Surface Coatings*, Academic Press, N.Y. (1974) p. 48.
*Powder Coatings Conference Procedings*, Cleveland State University, Cleveland, Ohio (1972).

*Primary Examiner*—Walter C. Danison
*Attorney, Agent, or Firm*—Frank J. Troy; J. Timothy Keane

[57] ABSTRACT

A novel method of preparing polymer based powder coating compositions involves as a first step the preparation of a mixture containing one or more ethylenically unsaturated monomers which are polymerizable by ionizing radiation, and optionally other coating composition additives. Optional additives which may be incorporated in the mixture include pigments, internal or external crosslinkers, chain transfer agents, flow promoters, plasticizers, viscosity control agents, minor proportions of resins, and the like. Pigments are especially desirable additives. The next step in the process is to apply a coating of the mixture to a substrate. Then, the coated substrate is subjected to ionizing radiation to polymerize the ethylenically unsaturated monomers and thereby form a solid film. Finally, the film is broken into particles by any of several mechanical means to form a polymer based powder coating composition which when applied to a substrate and baked, fuses to produce a film.

This novel and convenient method is particularly suited to the preparation of pigmented and unpigmented thermoplastic or thermosetting acrylic polymer-based powder coating compositions which form films having excellent properties.

12 Claims, No Drawings

PREPARATION OF POLYMER BASED POWDER COATINGS BY IONIZING RADIATION

This is a continuation of application Ser. No. 649,118, filed Jan. 14, 1976, now abandoned.

BACKGROUND OF THE INVENTION

This invention relates to a novel method of preparing polymer based powder coating compositions and, more particularly, to a method of preparing such polymer based powder coating compositions featuring the use of ionizing radiation.

In recent years, organic polymer based powder coating compositions have gained in interest to those in the coatings industry because of environmental pollution concerns and the increasing cost of petroleum based organic solvents.

Various prior methods of preparing such polymer based powder coating compositions have been employed. In one early method, the polymer and other ingredients necessary to formulate this coating composition preferably in solid form, were mixed together in a suitable mixing apparatus, the mixture was then extruded and the extruded material then subjected to a grinding process to obtain the powder coating material. While this method of preparing polymer based powder coating compositions insured intimate mixing of the various ingredients, it had several disadvantages. Thus, the method was a complex one which involved pre-crushing, premixing, extruding, cooling, grinding, sieving and dust collection. Furthermore, complete displacement of the processed material in the extruder was necessary to assure a uniform and homogeneous product while color matching was difficult to achieve from batch to batch.

More recent methods of preparing such polymer based powder coating compositions have employed a solution or non-aqueous dispersion process. However, both of these processes have a number of serious limitations.

The solution method, as exemplified in U.S. Pat. Nos. 3,730,930; 3,770,848 and 3,787,521 involves the formation of the polymer in solution and the subsequent drying (e.g., evaporation or spray drying) of the solution to obtain the powder. This solution method has several disadvantages. Thus, for example, small amounts of entrained solvent remaining after the drying process may cause tackiness and particle agglomeration. Further, the powder particles produced by this method usually have low bulk density characteristics which may lead to poor deposition efficiency. Finally, since highly volatile solvents are normally used in the spray drying of solution polymers, solvent reclamation is difficult and expensive while recovery of very fine particles is often difficult.

The non-aqueous dispersion method, as exemplified in U.S. Pat. Nos. 3,166,524; 3,218,287; 3,382,297 and 3,691,123 involves the formation of the polymer in an organic dispersing liquid in which the monomers are soluble but in which the resultant polymer is insoluble thereby forming a polymer dispersion and the subsequent drying of the dispersion to obtain the powder. The non-aqueous dispersion method while having significant advantages compared to the solution method also possesses several significant disadvantages. Thus, for example, in the formation of the polymer dispersion, complex and expensive dispersion stabilizers are normally required. Moreover, while not as great a problem as encountered in the solution method, minor amounts of entrained solvent may remain in the particles and solvent reclamation problems still exist.

The method of the present invention substantially obviates most, if not all of these disadvantages. Thus, in the method of this invention, the use of organic solvents, organic dispersing liquids, and complex dispersion stabilizers for polymerization is completely eliminated. The method of the invention is characterized by its convenience and simplicity of operation.

SUMMARY OF THE INVENTION

The aforementioned advantages of the method of this invention are accomplished by a novel process involving the steps of preparing a mixture of one or more ethylenically unsaturated monomers, which are polymerizable by ionizing radiation and optionally other desired additives; applying a coating of the mixture to a substrate; subjecting the coated substrate to ionizing radiation in order to polymerize the ethylenically unsaturated monomers in the coating and thereby form a solid film; and breaking the film into particles of polymer based powder coating compositions. The method is applicable to the preparation of pigmented or unpigmented thermoplastic or thermosetting polymer based powder coating compositions.

DETAILED DESCRIPTION OF THE INVENTION

As indicated, the first step in the process of this invention is to prepare a mixture containing one or more ethylenically unsaturated monomers, which are polymerizable by means of ionizing radiation, and any other desired optional additives.

The ethylenically unsaturated monomers which may be employed in the mixture may be virtually any monomers containing a $CH_2=C<$ group, which are polymerizable by ionizing radiation, and which do not otherwise impair the utility of the resultant polymer (e.g., cause premature polymer gellation). In general, it is preferred that the monomers utilized contain a single $CH_2=C<\lambda$ group (i.e., monoolefinic) in terminal position. Unsaturated monomers containing more than one double bond (e.g., diolefinic compounds) are less favored and should be avoided as these type monomers may lead to gellation problems. However, in some instances very minor proportions of diolefinic compounds may be utilized. Ethylenically unsaturated monomers which can most advantageously be utilized in the mixture broadly speaking include monoolefinic hydrocarbons, halogenated monoolefinic hydrocarbons, unsaturated esters of organic and inorganic acids, esters of unsaturated acids, unsaturated organo-nitriles, and unsaturated amides.

Illustrative of but a few of the many unsaturated monomers which may be employed in the mixture are monoolefinic hydrocarbons, such as styrene, alpha-methylstyrene, alpha-ethyl styrene, alpha-butyl styrene, vinyl toluene and the like; halogenated monoolefinic hydrocarbons, such as alpha-chlorostyrene, alpha-bromostyrene, 2,5-dichlorostyrene, 2,5-dibromostyrene, and the like; unsaturated esters of organic and inorganic acids such as vinyl acetate, vinyl propionate, vinyl butyrate, vinyl chloride, allyl bromide, allyl chloride, allyl acetate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, decyl acrylate, dodecyl acrylate, glycidyl acrylate, methyl methacrylate, ethyl methacrylate, propyl methacrylate, butyl methacrylate, isobutyl methacrylate, amyl methacrylate, hexyl methacrylate, decyl methacrylate, glycidyl methacrylate, 2-hydroxyethyl acrylate, 2-hydroxyethyl methacrylate, hydroxypropyl methacrylate, hydroxylauryl acrylate, hydroxylauryl methacrylate, dimethyl maleate, diethyl maleate, dimethyl fumarate and the like; unsaturated acids such as acrylic acid, methacrylic acid, ethacrylic acid, crotonic acid and the like; unsaturated organo nitriles such as acrylonitrile, methacrylonitrile, ethacrylonitrile and the like; and unsaturated amides such as acrylamide, methacrylamide, itaconic diamide, N-(methoxymethyl)acrylamide, N-(ethoxymethyl)acrylamide, N-(butoxymethyl)acrylamide, n-(butoxymethyl)methacrylamide and the like.

For a more detailed list of suitable monomers of the abovementioned types which may be employed in the mixture herein, reference may be made to U.S. Pat. No. 3,037,963 incorporated herein by reference.

As indicated above, the mixture prepared in the first step of the process of this invention can contain in addition to the ethylenically unsaturated monomer or monomers various other optional additives. Thus, for example if it is desired to prepare a thermosetting polymer based powder coating composition (e.g., thermosetting acrylic polymer based powder coating composition) a crosslinker can be included in the mixture. As is well known, the crosslinker can be either an internal crosslinking monomer or an external crosslinker. An internal crosslinking monomer is a monomer containing a functional group which will coreact under the influence of heat with the functional group of another monomer included in the polymer chain. These internal crosslinking monomers are incorporated into the polymer chain during polymerization. Examples of coreactive functional group-containing monomers are epoxy-containing unsaturated monomers such as glycidyl acrylate, glycidyl methacrylate and the like, amide-containing unsaturated monomers such as acrylamide, methacrylamide, N-(butoxymethyl)acrylamide, N-(butoxymethyl)methacrylamide and the like, hydroxyl-containing unsaturated monomers such as hydroxyethyl acrylate, hydroxyethyl methacrylate, hydroxypropyl acrylate, hydroxypropyl methacrylate, hydroxylauryl acrylate, hydroxylauryl methacrylate and the like and carboxyl-containing unsaturated monomers such as acrylic acid, methacrylic acid, and the like. When polymers produced from monomers containing these coreactive groups are subjected to heat, a coreaction between the functional groups occurs which produces a crosslinked polymer structure. External crosslinking agents are compounds which are not incorporated into the polymer but which will react with various functional groups present on the polymer backbone. Thus, polymers containing functional groups such as hydroxyl, carboxyl, amide or epoxy groups can be crosslinked with external crosslinking agents. Virtually any of the conventional external crosslinking agents utilized heretofore for thermosetting polymers may be used. Thus, well known crosslinking agents such as the aminoplast resins may be employed. Illustrative of such resins are for example, the alkylated melamine-formaldehydes such as methylated melamine formaldehyde, butylated melamine formaldehyde, and the like; alkylated urea formaldehydes such as methylated urea formaldehyde, butylated urea formaldehyde and the like; urea formaldehyde; benzoguanamine formaldehyde, hexa (methoxymethyl)-melamine; hexakis(methoxymethyl)melamine and similar compounds. In addition, external crosslinking agents such as capped isocyanates, blocked polyisocyanate prepolymers, epoxy-containing materials, aziridine derivatives and the like may be utilized.

Preferred optional additives which may be incorporated into the mixture include pigments. Any of the pigments commonly employed in coatings may be utilized including carbon black, titanium dioxide, phthalocyanine blue, phthalocyanine green, red iron oxide, indo red, indo yellow, molybdenum orange, monastral violet, ultramarine blue, cadmium red and many others.

Pigmented compositions are ordinarily opaque to radiation particularly radiation of the ultraviolet light type. However, ionizing radiation penetrates into and through the pigment, thereby permitting polymerization of the pigmented composition. This is why ionizing radiation is such a valuable feature of the invention.

The ethylenically unsaturated monomers and pigments may be mixed by any convenient method utilizing mixing procedures and equipment conventionally employed in the coatings industry. One convenient method is to employ a portion of ethylenically unsaturated monomers which are in liquid form to first grind the pigment and then to add the remaining ethylenically unsaturated monomers to the ground pigment.

Another method which is desirable and often preferred is to employ a resinous pigment dispersant or grinding vehicle. There are many resinous dispersants which are commercially available for that purpose. These resins are often low molecular weight resins which have a high carboxyl content. Illustrative of such pigment dispersants are the so-called Acrysol dispersants such as Acrysol I-94, a copolymer of butyl acrylate, methyl methacrylate, styrene and acrylic acid, available commercially from the Rohm and Haas Company.

As referred to above, in addition to the ethylenically unsaturated monomer or monomers, pigment and where desired crosslinkers, the mixture prepared in the first step of the process may include other optional additives commonly utilized in coatings such as for example flow promoters, plasticizers, chain transfer agents, viscosity control agents and the like.

Thus, conventional plasticizers such as dibutyl phthalate, butyl benzyl, phthalate, diisooctyl phthalate, decyl butyl phthalate, diisooctyl adipate, dibutyl sebacate, butyl benzoate triisooctyl trimellitate, n-octyl n-decyl trimellitate, and tricresyl phosphates and flow promoters such as phenyl benzoate, dibenzyl ketone, benzyl methyl ketone and the like may be included.

Various conventional chain modifying agents or chain-transfer agents may be included in the mixture. The preferred chain-transfer agents are the mercaptan compounds such as dodecyl mercaptan, tertiary-dodecyl mercaptan, octyl mercaptan, hexyl mercaptan and the like.

Any of the conventional viscosity control agents may be employed in the mixture herein. The preferred materials are resinous or polymeric viscosity control agents. Many of these resinous materials are available. Illustrative of such materials are cellulose acetate butyrate, sodium carboxymethyl cellulose and the like. The use of such resinous or polymeric viscosity control agents is advantageous in that it permits the mixture to be prepared in the form of a viscous mass or syrup having sufficient viscosity to remain in place on the substrate until polymerization is effected.

As mentioned above, minor proportions (i.e., up to about 15 percent by weight based on monomer solids) of resins (other than those employed as dispersant or viscosity control agents) may be included as optional additives in the mixture. These resins may be utilized to achieve desirable chemical or physical properties such as toughness, hardness, flexibility, solvent resistance and the like in the finished film. Various resins can be included in the mixture in that purpose including among others, polyalkyl acrylate or methacrylate polymers or copolymers such as for example the polymethyl methacrylate resins.

The amounts of ethylenically unsaturated monomers or optional additives, if any, will vary considerably depending upon the specific nature of the powder coating composition and the physical and chemical properties desired in the finished coating. Thus, for example, if an unpigmented (i.e., clear) thermoplastic powder coating composition is desired, the mixture may consist entirely of the ethylenically unsaturated monomers. If a pigmented composition is desired, the mixture may contain from about 2 percent to about 30 percent by weight (based on monomer solids) of pigment. If it is desired to use a crosslinker in the composition, the mixture may contain from about 5 to about 40 percent by weight (based on monomer solids) of the crosslinker. If it is desired to use a plasticizer and/or flow promoter, the mixture can contain from about 2 percent to about 40 percent by weight (based on monomer solids) of the plasticizer and/or promoter. It is preferred to use about 20 percent by weight of either the plasticizer or flow promoter or a combination of the two. If it is desired to employ a chain transfer agent, the mixture can contain from about 0.1 percent to about 10 percent by weight (based on monomer solids) of the chain transfer agent. If a viscosity control agent is used, the mixture can contain from about 2 percent to about 10 percent by weight (based on monomer solids) of the viscosity control agent. If it is desired to include resins in the mixture, the mixture can contain from about 1 percent to about 15 percent by weight (based on monomer solids) of such resins.

The second step in the process of the invention is to apply a coating of the above described mixture to a substrate. The coating can be applied by any convenient method such as brushing, dipping, flow coating, roll coating, and the like. Various substrates can be employed such as glass, wood, metal and the like.

As indicated, a coating of the above described mixture is applied to the substrate. The thickness of the coating applied to the substrate may vary considerably depending upon factors such as the nature of the material intended to be processed, the radiation equipment utilized, the method of removal of the resultant film, and the like.

The next step in the process is to subject the coated substrate to ionizing radiation in order to polymerize the ethylenically unsaturated monomers therein and thereby convert the coating to a solid film.

As indicated, the ethylenically unsaturated monomers in the applied coating are polymerized by exposure to ionizing radiation. Ionizing radiation is radiation possessing an energy at least sufficient to produce ions and includes ionizing particle radiation and ionizing electromagnetic radiation. Ionizing particle radiation designates the emission of electrons or accelerated nuclear particles such as protons, alpha particles, deuterons, beta particles, neutrons or their analogs. Charged particles can be accelerated using such devices as resonance chamber accelerators, DC potential gradient accelerators, betatrons, synchrotrons, cyclotrons, etc. Neutron radiation can be produced by bombarding a selected light metal such as beryllium with positive particles of high energy. Ionizing particle radiation can also be obtained by the use of an atomic pile material. Ionizing electromagnetic radiation comprises high energy photons. Examples are X-rays, bremsstrahlung and gamma rays.

X-rays may be produced when a metallic target such as tungsten, copper or molybdenum is bombarded with electrons of suitable energy. This energy is conferred to the electrons by accelerators, usually, but not necessarily, of the linear type. Travelling wave linear accelerators, standing wave linear accelerators and DC potential gradient linear accelerators are ordinarily employed for this purpose.

Bremsstrahlung, also known as continuous X-rays, is produced by the deceleration of electrons. The continuum extends from a short-wave limit indefinitely toward the long wavelength end of the spectrum.

Gamma rays may be obtained by means of a nuclear reactor, such as a pile, by the use of natural or synthetic radioactive materials such as cobalt 60 or radium which emit in the $(n,\gamma)$ reaction.

The ionizing radiation, whether particle radiation or electromagnetic radiation, ordinarily has an energy of at least 10 electron volts. While there is no upper limit to the energy of ionizing radiation which can be used advantageously, the effects desired in the practice of this invention can be accomplished without resorting to the use of ionizing radiation having energies above about 20,000,000 electron volts.

Accelerated electrons is the preferred ionizing radiation for polymerizing the monomers in the applied coating. Bremsstrahlung generated by the deceleration of the electrons is also present and probably contributes. Various types of high power electron linear accelerators which are commercially available, for example, the ARCO type travelling wave accelerator, Model Mark I. operating at 3 to 10 million electron volts supplied by High Voltage Engineering Corporation, Burlington, Mass., or other types of accelerators, such as described in U.S. Pat. No. 2,763,609 and British patent specification No. 762,953 are satisfactory for the practice of this invention. Usually the electrons are accelerated to energies in the range of from about 20,000 electron volts to about 1,000,000 electron volts. Typically, the energy is in the range of from about 20,000 electron volts to about 500,000 electron volts. Preferably the energy is in the range of from about 25,000 electron volts to about 100,000 electron volts.

The unit of dose of ionizing radiation is the "rad" which is equal to 100 ergs of energy absorbed from ionizing radiation per gram of material being irradiated and a megarad is $10^6$ rads. Dose is initially determined using an absolute method such as calorimetry or ionization dosimetry. These absolute methods are quite sophisticated and hence are not generally practical for routine determinations. Once a radiation field has been explored by an absolute method of dosimetry, it is possible to calibrate secondary radiation indicators in that field using relative dosimetry techniques. One simple method of relative dosimetry is based upon the bleaching of blue cellophane by ionizing radiation. The blue cellophane is exposed to a standard source for a known time and the transmittance is measured with a spectrophotometer at 655 nanometers. The transmittance of unexposed cellophane is also measured and the percent change in transmittance due to exposure to ionizing radiation is calculated. From several such readings and calculations, a graph may be constructed relating change in transmittance with dose. A blue cellophane manufactured by the E. I. du Pont de Nemours & Company has been used for this purpose. The calibrated blue cellophane may then be used to calibrate other sources of the same kind of radiation and other kinds of blue cellophane which may be used in routine work. A visco cellophane 195 CMS light blue manufactured by the American Viscose Division of FMC Corporation has been calibrated and used for routine dose determinations. In practice, the calibrated blue cellophane is exposed to the ionizing radiation before, after or simultaneously with the coated substrate being irradiated. The dose received by the coating is considered to be the same as that received by the blue cellophane. This presumes that the absorption of energy by the coating is the same as that of the blue cellophane. Except for materials containing rather large proportions of atoms of very high atomic weight, the absorption of ionizing radiation is nearly independent of the identity of the material. The presumption is therefore valid for the ordinary work of coatings manufacturing where very high degrees of accuracy of dose measurement are not needed. As used throughout the specification and claims, dose is referenced to the bleaching of calibrated blue cellophane film irrespective of the identity of the coating composition being irradiated.

The monomers described herein will polymerize acceptably using any total dosage between about 1 megarads and about 150 megarads.

The irradiation step of the process is best carried out by passing the coated substrate under electron beam irradiation at a certain line speed for a designated time. The particular speed and time is not critical as long as the coated substrate is exposed to the irradiation for a time long enough to acquire a total dose of from about 1 to about 150 megarads. It should be noted that in some instances it may be desirable depending upon total dosage required for polymerization to pass the coated substrate through the irradiation apparatus more than once. The line speed used may be varied according to apparatus limitations. However, it is desirable that the line speed be slow enough so that the mixture will not flow off the substrate during polymerization. The preferred range for total dosage is between about 3 megarads and about 100 megarads. The irradiation is preferably carried out in an inert atmosphere, such as nitrogen gas.

The final step in the process of the invention is to break the film resulting from the ionizing radiation polymerization step into particles of powder coating composition. This can be readily accomplished by any of various conventional mechanical means. Thus, the film can be broken into particles by scraping, crushing, pulverizing, and the like. If desired, the particles obtained from the breaking process can be further reduced in size by grinding, utilizing conventional grinding equipment.

The polymer based powder compositions produced by the process of the invention can be applied to various substrates such as metals, plastics, glass and the like using conventional powder coating techniques such as electrostatic spraying and fluidized bed techniques. The polymer based powder coating composition prepared by the process of the invention when applied to a substrate by one of these techniques and baked at elevated temperatures fuses to produce a film having excellent chemical and physical properties.

The following examples are submitted for the purpose of further illustrating the nature of the present invention and should not be construed as a limitation on the scope thereof. Unless otherwise indicated, all parts and percentages in the examples are by weight.

EXAMPLE I

Into a stainless steel beaker was charged 600 grams of ethyl acrylate, 600 grams of styrene, 400 grams of methyl methacrylate, 200 grams of hydroxyethyl acrylate, 200 grams of isobutyl methacrylate, and 680 grams of an epsilon-caprolactam blocked 1,6-hexane diol-isophorone diisocyanate prepolymer formed by reacting a mixture consisting of 56.2 percent isophorone diisocyanate, 14.8 percent 1,6-hexanediol and 28.8 percent epsilon-caprolactam.

The above ingredients were mixed thoroughly using a stirrer. A small portion of the mixture was then utilized to grind 965 grams of titanium dioxide in conventional manner to form a pigment paste. The pigment paste and the remaining portion of the monomer mixture were then combined and further mixed.

A sample of the resulting mixture of monomers, pigment and prepolymer (crosslinking agent) was then drawn down on a glass substrate utilizing a 5 inch long Bird Bar to form a coating of approximately 3 mils in thickness.

The coated substrate was then subjected to electron beam impingement in a nitrogen atmosphere at a rate of about 5 feet per minute, an accelerating potential of 300 Kev and a tube current of 60 milliamps having a beam scan of 48 inches. The coated substrate was exposed to the electron beam in two passes at a dosage of 40 megarads per pass for a total dosage of 80 megarads.

The resulting coating was a solid film. The film was then scraped off the glass substrate in particles with a razor blade.

The resulting powder particles were sprinkled over hot aluminum and fused readily to produce a film having good adhesion.

EXAMPLE 2

Into a stainless steel beaker was charged 300 grams of ethyl acrylate, 300 grams of styrene, 200 grams of methyl methacrylate, 100 grams of hydroxyethyl acrylate, 100 grams of isobutyl methacrylate and 340 grams of the epsilon-caprolactam blocked 1,6-hexane diol-isophorone diisocyanate prepolymer of Example 1. The above ingredients were mixed thoroughly. A small portion of the mixture was then utilized to grind 482 grams of titanium dioxide to form a pigment paste. The pigment paste and the remaining portion of the mixture were then combined and further mixed.

A sample of the resulting mixture of monomers, pigment and prepolymer was then drawn down on a glass substrate utilizing a 5 inch long Bird Bar to form a coating of 3 mils in thickness.

The coated substrate was then subjected to electron beam impingement utilizing the same procedure, process conditions and dosage as in Example 1.

As in Example 1, the resulting coating was a solid film. The film was scraped from the glass substrate in particles utilizing a razor blade.

A sample of the resulting powder coating composition was tested and found to have the following properties:

Gel time at 177° C.—5 minutes, 10 seconds
Softening point—62.5° C.
Melting point —105°–120° C.

An additional sample of the resulting powder coating composition was then ground with a mortar and pestle and the ground material then applied by a conventional electrostatic spray apparatus over a steel panel primed with a commercial lacquer primer. The powder coated substrate was then baked for 15 minutes at 350° F. to produce a film having excellent adhesion.

We claim:

1. A method of preparing a polymer based powder coating material which comprises the steps of:
   (a) preparing a mixture comprising one or more monomers each having substantially no more than one ethylenically unsaturated group, which mixture is polymerizable by means of ionizing radiation to form a thermoplastic, substantially non-crosslinked film;
   (b) applying a coating of said mixture to a substrate;
   (c) subjecting the coated substrate to ionizing radiation to polymerize said ethylenically unsaturated monomer or monomers in said coating and to thereby form a solid thermoplastic, substantially non-crosslinked film; and
   (d) breaking and reducing said film into substantially powder-sized particles of polymer based powder coating composition which when electrostatically deposited upon a substrate and baked, fuse to produce a film.

2. The method of claim 1 wherein said mixture of ethylenically unsaturated monomers is a mixture of acrylic monomers.

3. The method of claim 2 wherein at least one of the acrylic monomers of the mixture is an acrylic monomer having a hydroxyl, carboxyl, epoxy or amide group and an external crosslinking agent is added to the mixture.

4. The method of claim 3 wherein said acrylic monomer is a hydroxyalkyl ester of acrylic or methacrylic acid.

5. The method of claim 4 wherein said acrylic monomer is hydroxyethyl acrylate.

6. The method of claim 3 wherein said crosslinking agent is a blocked polyisocyanate prepolymer.

7. The method of claim 6 wherein said blocked polyisocyanate prepolymer is an epsilon-caprolactam blocked, 1,6-hexanediol-isophorone diisocyanate prepolymer.

8. The method of claim 1 wherein a minor proportion of resin is added to said mixture.

9. The method of claim 1 wherein pigments, plasticizers, flow promoters, chain transfer agents, viscosity control agents or combinations thereof are added to said mixture.

10. The method of claim 1 wherein said ionizing radiation is accelerated electrons.

11. The method of claim 1 wherein the total dosage of irradiation is from about 1 to about 150 megarads.

12. The method of claim 1 wherein said film is broken by means of scraping, crushing, or pulverizing.

* * * * *